Patented July 3, 1951

2,559,062

UNITED STATES PATENT OFFICE 2,559,062

FRIEDEL-CRAFTS METAL HALIDE-ETHER COMPLEXES AS POLYMERIZATION CATALYSTS

Ralph W. Dornte, Westfield, N. J., assignor to Standard Oil Development Company, a corporation of Delaware No Drawing. Application November 27, 1945,
Serial No. 631,237

5 Claims. (Cl. 260—93.5)

This invention relates to low temperature polymerization processes, relates particularly to the low temperature interpolymerization of isobutylene with other olefins, diolefins and multi-olefins; and relates especially to polymerization and copolymerization by the use of a stable composition of a Friedel-Crafts catalyst and an ether.

It has been found possible to copolymerize isobutylene with a multi-olefin such as butadiene, isoprene, dimethyl butadiene, dimethallyl, myrcene, and the like, by mixing together a major proportion of the isobutylene and a minor proportion of the multi-olefin and polymerizing the mixture at temperatures ranging from 0° C. to —40° C. down to —164° C. by the application thereto of a Friedel-Crafts catalyst in solution in a low-freezing, non-complex-forming solvent such as aluminum chloride dissolved in ethyl or methyl chloride, or the like. The polymerization reaction is, however, difficult and, in some ways, unsatisfactory because of the tendencies towards irregular polymerization, after-polymerization, delayed polymerization action, and similar difficulties.

According to the present invention it is now found that a substantial degree of control can be exerted over the polymerization reaction and over the characteristics of the polymer produced, by the use of a complex addition compound of the Friedel-Crafts active metal halide catalyst with an ether. The specific catalytic effects of the Friedel-Crafts etherate complexes are to modify the ratio of copolymerization between the isobutylene and a multi-olefin; to modify the molecular weight of the resulting polymer or copolymer, usually by an increase in the molecular weight; and to modify the physical properties of the resulting polymer. In addition, the reaction proceeds more smoothly, and more efficiently, requiring a smaller amount of polymerization catalyst to yield a better slurry of polymer in reaction mixture, and other advantages.

The etherate complex catalysts are less sensitive to impurities in the feeds than the simple Friedel-Crafts catalysts since a much lower concentration of dispersed catalyst in the monomer feed may be effectively used with the complex than with aluminum chloride itself. Thus, in copolymerizations of isobutylene and isoprene the concentration of titratable catalyst in the reactor liquor with the complex catalyst, $$Al_2Cl_6.2C_6H_5OCH_3$$

is one-tenth of the value of aluminum chloride. The total amount of catalyst solution required for initial polymer formation is also much less for the complex catalyst than for the simple Friedel-Crafts catalyst.

Furthermore, the etherate complex catalysts, particularly in the presence of an excess of the complex-forming ether, are not deactivated by poisons at a mole ratio which deactivate the Friedel-Crafts catalyst alone. The etherates of the Friedel-Crafts catalysts produce a satisfactory copolymer of isoprene and isobutylene at a higher temperature of polymerization than is feasible using the simple Friedel-Crafts catalysts. The etherate complexes with aluminum chloride permit the use of hydrocarbons and certain halogenated hydrocarbons as catalyst solvents in which aluminum chloride is insoluble. The etherate complexes moreover produce satisfactory copolymers of isobutylene and isoprene in systems in which no diluent is used in the monomer feed when under the same conditions the simple Friedel-Crafts catalysts lead to the formation of insoluble highly cross-linked copolymers which are difficult to process and yield poor physical properties in the vulcanizates. The complex etherate catalysts moreover permit the use of large variety of diluents and catalyst solvents in which the Friedel-Crafts are insoluble.

The complex etherate catalysts moreover soluble polydiolefins such as polyisoprene, which is difficult or impossible to obtain with the simple Friedel-Crafts type catalysts. The operation with a diolefin in the catalyst solution, as in Serial No. 607,504, now U. S. Patent 2,516,683 is facilitated by use of the etherate complexes, since under these conditions the diolefin is stabilized by equilibria involving the ether, the diolefin and the Friedel-Crafts catalyst.

It has previously been considered that oxygenated organic compounds in general were, without exception, deactivators of the Friedel-Crafts catalyst as far as the low temperature polymerization procedure was concerned, and it is customary procedure in the polymerization art to destroy or deactivate the catalyst at the end of the polymerization reaction by the addition to the reaction mixture of almost any oxygenated organic compound. The alcohols have been preferred because of their convenience and availability, but various of the ethers, the aldehydes, ketones and organic acids have been found to be just about as satisfactory as catalyst deactivators.

According to the present invention, it is now found that, contrary to prior opinions, the ethers do not necessarily deactivate the catalyst if they are present in limited amounts but they serve to improve the polymerization reaction in many ways, and may even be used as catalyst solvent. Usually, definite complexes are formed with the Friedel-Crafts catalyst substance which may be isolated, and then dissolved in a suitable solvent to produce a very marked and important improvement in the polymerization reaction. While definite complex compounds with one mole of ether per mole of Friedel-Crafts catalyst can be isolated and used when dissolved in a suitable solvent, for certain purposes, such as limiting the deactivation effects of impurities in the feeds, it may be desirable to have the mole ratio of ether to Friedel-Crafts reagent as high as 10 or 20 in the final catalyst solution. With some of the Friedel-Crafts catalyst complexes, especially the unsaturated ethers, it is preferable to prepare the complex in solution and keep it so until used. The composition of the isolated complex compounds for all of the Friedel-Crafts catalyst substances appears to be in the neighborhood of 1 mole of ether per mole of active halide metal catalyst.

It may be noted that a necessary limitation upon the ethers used in the formation of the etherate complexes is that they have a molecular weight above about 90 to 100. That is, simple methyl or ethyl ether is inoperative for the purposes of the present invention and it is only when the higher ethers are reached, such as propyl and butyl ethers, that the benefits of the invention are observed. It should be noted that this limitation appears to be strictly and solely a molecular weight effect, since chlorinated ethyl ether having a molecular weight of 108 is effective and satisfactory. As far as it has been possible to ascertain to the present, all ethers, without regard to their composition or substituents, having molecular weights above 90 to 100, are effective for the present reaction, and no upper limit has been discovered.

It has been considered in the past that the aluminum chloride catalyst in solution in ethyl or methyl chloride yielded an instantaneous reaction upon addition to cold isobutylene. This, however, is not strictly so, since a definite concentration of catalyst must be built up in the liquid before the reaction begins, and even after the minimum concentration of catalyst is exceeded, there is a brief time delay on the order of a fraction of a second, sufficiently long to permit of the stirring into an isobutylene mixture of the catalyst by a powerful stirrer, before the reaction proceeds. With the present catalyst, the minimum concentration is either non-existent or very much lower in magnitude since the polymerization appears to begin without any perceptible delay upon the addition of the catalyst solution to the cold isobutylene-containing mixture. Also, when the simple aluminum chloride solution catalyst is stirred rapidly into a large bulk of solution, the stirring is sufficiently complete so that the polymerization occurs throughout the bulk of the solution. In comparison, with the present catalyst, when the catalyst complex solution is injected into the powerfully stirred body of cold isobutylene, the copolymer is thrown down very close to the point of delivery rather than throughout the bulk of cold liquid, and the estimate of distance of travel and speed of travel indicates that the copolymerization is complete in a time much less than $\frac{1}{10}$ of a second, probably less than $1/100$ of a second, the speed of reaction thereby being different in order of magnitude from that of prior catalysts.

Thus the present invention produces a composition of matter comprising a complex of a Friedel-Crafts catalyst and an ether in solution in a low-freezing, non-complex-forming solvent, with the ether usually present in a proportion of one or two moles of the amount of Friedel-Crafts catalyst present, although mole ratios as high as 10 or 20 (ether to active metal halide) may be employed. This catalyst composition serves to speed up and improve a lower temperature olefinic polymerization reaction and to give a better control of the reaction and to give a superior polymer. Other objects and details of the invention will be apparent from the following description:

In practicing the invention, there is prepared an etherate complex by dissolving the ether in a solvent such as carbon disulfide or methyl chloride and boiling the solvent with the suspended aluminum chloride until solution is complete. The complex or addition compound may then be recovered by evaporating off the solvent or by recrystallization in the solvent. For example, one-tenth mole of anisole is dissolved in 100 cc. of methyl chloride and one-tenth mole of solid aluminum chloride is added and the solution boiled to speed the solution of the solid. The solid complex compound is recovered by crystallization from methyl chloride. The preparation is very simple and beautiful fine crystals are obtained which are much less reactive with water than is aluminum chloride. The complex etherate is highly soluble in methyl chloride so that the preparation of the catalyst solution is simplified. With the complex $Al_2Cl_6 \cdot 2C_6H_5OCH_3$ a concentration containing as much as 35 g. aluminum chloride per 100 cc. methyl chloride is possible and this solution has a boiling point above room temperature (25° C.). This concentrated catalyst solution may be diluted one to two hundred-fold, in preparing the catalyst solution. This complex is moreover soluble in hydrocarbons, in fluorinated and in chlorinated hydrocarbons in which aluminum chloride is too insoluble to be useful as a catalyst.

As an alternative procedure, there is first prepared a solution of a Friedel-Crafts catalyst in a low-freezing, non-complex-forming solvent at a concentration ranging from about 0.3% to saturation, the preferred range being from about 0.5% to about 2% of the Friedel-Crafts active metal halide in the solvent. This solution is made to contain, in addition, from 0.1 mole to 10 moles of the desired ether, which may be added before or after the making of the catalyst solution, depending upon the solvent and the catalyst.

For the Friedel-Crafts catalyst, among those which are best adapted for the preparation of their ether complexes are aluminum chloride, titanium tetrachloride, and boron trifluoride.

The Friedel-Crafts catalyst prepared as above described is preferably used in solution in a low-freezing, non-complex-forming solvent, by which there is meant a solvent which will dissolve an adequate amount of the Friedel-Crafts catalyst; at least 0.3%, which has a freezing point substantially below 0° C.; although not necessarily as low as the polymerization temperature; which, in addition, does not form a complex with the Friedel-Crafts catalyst substance. The criterion for complex formation is excellently set forth by Findlay in "The Phase Rule and Its Applications," Sixth Edition, Longmans, Green & Company, New York. According to Findlay a solvent is non-complex forming when the addition of the solvent in the form of a vapor to the catalyst will lead to a continuous change in the composition of the catalyst phase and to a continuous increase in the pressure; and similarly, the withdrawal, at constant temperature, of the solvent in the form of a gas from the wet catalyst phase which has been equilibrated with a saturated solution of the catalyst, will lead to a continuous change in the composition of the catalyst phase and a continuous diminution of the vapor pressure of the solvent (with a complex-forming solvent the continued addition of the solvent vapor at constant temperature to the catalyst phase causes an increase in vapor pressure, until at a definite value of the pressure a dissociating compound is formed; the pressure then becoming constant and remaining so until all of the original catalyst phase has disappeared.) Representative catalyst solvents are such substances as ethyl or methyl chloride, ethylene dichloride, chloroform, carbon disulfide, and the like, and with some of the catalysts, the lower freezing hydrocarbons such as liquid ethane, liquid propane, liquid butane, liquid pentane, and the like.

The catalyst solution is prepared by dissolving the Friedel-Crafts catalyst complex in the low-freezing, non-complex-forming solvent in a suitable concentration. The catalyst solution is preferably prepared at a temperature as high as convenient, usually relatively near to the boiling point of the solvent, which, with methyl chloride, is $-23°$ C. and with ethyl chloride, is $+12°$ C. The catalyst solution is then cooled to a temperature well below $-23°$ C. This is conveniently obtained by cooling the catalyst solution with solid carbon dioxide either by direct admixture or by the use of a refrigerating jacket containing solid carbon dioxide with ethyl alcohol or propyl alcohol or other convenient heat transfer medium, as desired.

The primary component of the polymerization mixture preferably is isobutylene, although, under some conditions, useful polymers may be obtained from other isoolefins such as 2-methyl butene-1, 2 methyl pentene-1, 2-methyl hexene-1, 2-methyl heptene-1, and the like, up to 10 or 12 carbon atoms per molecule. These latter isoolefins polymerize so much less readily, however, that for most purposes, isobutylene is the preferred copolymerizate. The secondary component of the copolymerizate may be present in almost any desired proportion, and the secondary component may be one or more different substances to yield 3 component or 4 component copolymerizates. Significant amounts of any of the materials are from 0.5% to 1% for the secondary components, and a major proportion of the primary component for most reactions, although for a limited number of reactions, the multi-olefin may be the primary component, and the mono olefin, the secondary component.

The copolymerizates may desirably include any of the multi-olefins having from 4 to 12 or 14 carbon atoms per molecule; including such substances as butadiene, isoprene, dimethyl butadiene, dimethallyl, myrcene, alloocimene, and the like; as well as styrene and the various alkyl, nitro and halogen substituted styrenes.

The types of ethers which may be applied for our purposes may not be indiscriminately selected. The effect of the ether is dependent upon the specific Friedel-Crafts catalyst employed, the structure of the ether and the mol ratio of the ether to the metal halide. The lower dialkyl ethers-dimethyl to dipropyl ether do not form useful complex compounds with aluminum chloride for example since in these cases the complex compounds are inactive in the low temperature polymerization of isobutylene or copolymerization of an isoolefin and a diolefin. With di-n butyl ether however the complex with aluminum chloride has sufficient activity to form an oil with isobutylene at $-23°$ C. The general characteristic of the etherates appears to be associated or parallel to the molecular weight of the ether. The dibutyl ethers have a molecular weight of 130 which is probably near to the lower limit for the simple dialkyl ether. The symmetrical substitution of a halogen in the lower dialkyl ether appears to lead to active complex compounds for our purposes for example the $aa'$ dichloro methyl ether (mol. wt. 115) forms useful complexes with aluminum chloride. The $\beta\beta'$ dichloroethyl ether complex with aluminum chloride is a very useful catalyst for our purposes. The aryl-alkyl mixed ethers are all suitable complex forming compounds, the lowest molecular weight here is 108 for phenyl methyl ether. The nuclear or alkyl substitution of halogen in these mixed ethers are also useful complex forming compounds. Examples of these types are o-chloro phenyl ethyl ether and $\beta$ chlorethyl phenyl ether, both of which are satisfactory catalyst solvents for aluminum chloride and titanium tetrachloride. This is indicated by the activity of the respective etherates when dissolved in an excess of the ether for the low temperature polymerization of isobutylene. The nitro-aryl ethers such as o-nitro anisole or o-nitro diphenyl ether are likewise useful complex forming compounds. The di-ethers of the type of 1,2 diphenoxy ethane are useful in complex compound formation with both aluminum chloride and titanium tetrachloride. The cyclic ethers of the type dibenzofurane are also useful.

The unsaturated ethers vinyl phenyl ether, allyl phenyl-ether, methallyl-butyl ether, vinyl butyl ether and the like may be used as complex forming components with the non-gaseous Friedel-Crafts type catalysts. In this embodiment the complex addition compound will be stable only in solution and its stability will depend upon the catalyst concentration and the temperature. Such complex compounds may be utilized only in solution since polymerization is likely to occur in the event that the isolation of the complex addition compound is undertaken. The utilization of the complex catalysts of the unsaturated ethers may follow in general the conditions disclosed in the use of diolefin complexes.

For the polymerization reaction, the olefinic material is preferably cooled to a temperature below 0° C. down to as low as $-164°$ C.; although for most purposes, the preferred polymerization temperature range is between $-40°$ C. to $-103°$ C. A preferred polymerization temperature range in which the ether complexes may be employed is $-10°$ C. to $-103°$ C. This cooling may be accomplished by the use of a refrigerating jacket upon the reactor, any convenient refrigerant being used including such substances as liquid propane, liquid carbon dioxide, liquid ammonia, liquid sulfur dioxide, liquid ethane, liquid ethylene, liquid methane, or even liquid nitrogen under vacuum or pressure as desired, according to the temperature to be obtained. The preferred temperatures are $-78°$ C. as set by liquid or solid $CO_2$ or $-88°$ C. as set by liquid ethane, or $-103°$ C. as set by liquid ethylene. Alternatively, the refrigerant may be added directly to the isobutylene, in which case the refrigerants are limited to the carbonaceous refrigerants including liquid propane, liquid or solid carbon dioxide, liquid ethane, liquid ethylene, and occasionally liquid methane. When the isobutylene has been cooled to the desired low temperature, the catalyst-ether complex solution is added to the rapidly stirred isobutylenic material. A preferred method is by the delivery of the catalyst-ether complex solution in the form of fine droplets from a nebulizer onto the surface of the rapidly stirred isobutylene. Alternatively, the catalyst-ether solution may be delivered into the body of rapidly stirred isobutylene in the form of a fine jet. Rapid dispersion is, however, both desirable and advantageous.

The reaction proceeds with extreme speed, a speed higher than is obtainable by any other known similar reaction procedure; and, in addition, the reaction proceeds rapidly to the complete utilization of the catalyst, and there is a negligible amount of after polymerization.

The resulting polymer is a linear chain compound having many of the properties of caoutchouc or natural rubber; especially if the polymerized mixtures contains a major proportion of isobutylene. The resulting copolymer may be prepared with a Staudinger molecular weight number ranging from 1,000 to 2,000 up to 250,000; and when the copolymer has a Staudinger molecular weight number above about 20,000 it is curable with sulfur or para quinone dioxime or dinitroso benzene or the like, to yield an excellent replacement material for caoutchouc. The molecular weight materials below about 20,000 may react with sulfur chloride and with para quinone dioxime, but the linear chain is too short and contains too few residual double linkages to permit of the establishment of the cross linkages which are characteristic of the curing reaction. It may be noted that these Staudinger molecular weight numbers are not true molecular weights and that the polymers produced have actual molecular weights as determined by the physical chemical methods outlined by Flory in the Journal of the American Chemical Society, volume 65, page 372 (1943), ranging from 5,000 or 10,000 to 6,500,000; a Staudinger molecular weight number of 25,000 corresponding to an actual molecular weight of 185,000; a Staudinger number of 125,000 corresponding to an actual molecular weight of 2,300,000, and so on, as shown by Flory. It may be noted that in the polymerization reaction one of the double linkages disappears from each molecule of multi olefin leaving one or more double linkages present in the polymer chain for each molecule of multi olefin interpolymerized, the number of residual double linkages being always one less than the number of double linkages in the monomer molecule. The preferred range of iodine number is from approximately 0.5 to approximately 50, although the most useful polymers have iodine numbers within the range between about one to about 20.

The iodine number is a function of the amount of multi olefin copolymerized, since the polymerization of the isobutylene destroys from all the isobutylene molecules all but one double linkage; and the copolymerization destroys one double linkage from each multi olefin molecule. A convenient measure of the unsaturation is the so-called "molecular unsaturation." According to this measure, a molecular unsaturation of 100% is obtained by the polymerization of a diolefin, such that one double linkage is retained in the polymer for each molecule of multi olefin polymerized. Thus, if natural rubber is regarded as a polymer of isoprene, it has a molecular unsaturation of 100%. At the other end of the scale, polyisobutylene has a molecular unsaturation of substantially zero, since it contains no polymerized multi olefins and the one residual double linkage left per polymer molecule is substantially imperceptible. When, however, a copolymer is prepared, a copolymer containing equal parts of isobutylene and butadiene would have a molecular unsaturation of 50%, a copolymer containing 75% isobutylene and 25% butadiene would have a molecular unsaturation of 25%. The preferred polymers according to the present invention contain a molecular unsaturation in the general neighborhood of 1, 2, 3, or 4%, since this is found to be sufficient for a curing reaction and the cured polymer behaves as if all of the double linkages were saturated by the curing.

The polymer may be recovered from the reaction mixture by separating out the solid polymer in any convenient way. If the reaction is not carried too far, a sufficiently good slurry is obtained to be conveniently strained out from the reaction mixture. Alternatively, the whole reaction mixture may be discharged into warm water to volatilize out any residual refrigerant, catalyst solvent and unreacted components, yielding a slurry of solid polymer in water from which it is readily recovered. The polymer is then desirably milled on the double roll mill to drive off moisture and any residual traces of adsorbed hydrocarbon materials.

The resulting polymer is reactive with sulfur and other curing agents such as para quinone dioxide and its analogues and homologues or dinitroso benzene and its analogues and homologues (with sulfur the reaction is particularly convenient in the presence of a sulfurization aid); to develop in the polymer an elastic limit, a substantial tensile strength, and an excellent elongation at break.

An advantageous compounding recipe is:

Recipe 1

|  | Parts by weight |
|---|---|
| Copolymer | 100 |
| Stearic acid | 1 to 5 |
| Zinc oxide | 1 to 20 |
| Sulfur | 1 to 5 |
| Tetra methyl thiuram disulfide | 1 |

To this recipe there may be added, if desired, from 10 parts to 200 parts of an appropriate carbon black, depending upon the desired characteristics in the cured polymer. This mixture is then cured at temperatures ranging from 275° F. to 350° F. for time intervals ranging from 5 minutes to 120 minutes to yield an excellent substitute for natural rubber (or caoutchouc) which has a tensile strength within the range between 500 pounds and 4500 pounds per square inch; an elongation at break ranging from 500% to 1200%, depending in large part upon the amount of carbon black in the compounding recipe; and a modulus (that is, pounds pull per square inch to stretch the cured material by 300%) ranging from 150 to 1000 pounds, depending in part also upon the amount of carbon black present, and the character of curing agent. It will be obvious that this material is an excellent substitute for caoutchouc in all of its applications; and its property of high impermeability to gases which is ten times as high as natural rubber renders it especially suitable for automobile inner tubes, proofed goods, tires, belting, and similar structures.

The catalyst may be prepared in a number of different ways. Thus, desired amounts of the Friedel-Crafts catalyst, usually aluminum chloride, and the desired ether may be added to ethyl or methyl chloride or carbon disulfide, as desired, and the mixture stirred or shaken until solution is complete. It may be noted that the solubility of aluminum chloride in methyl or ethyl chloride is much higher in the presence of equimolar amounts of ether, indicating some sort of a co-reaction or compound formation. Also in most instances, the complex of aluminum chloride and ether may be recovered in pure crystal form by allowing the solvent such as ethyl or methyl chloride or carbon disulfide to evaporate until most of the catalyst complex has precipitated and then recrystallized. With aluminum chloride, diethyl ether forms colorless plates, melting at 33–35° C. whose molecular formula is $Al_2Cl_6.2C_2H_5OC_2H_5$; this complex is completely decomposed at 106° C. Di-n-propyl ether forms a red liquid complex of the composition $Al_2Cl_6.2C_3H_7OC_3H_7$. These reactions are carried out at 35–50° C. without diluent; the resulting sirup is cooled to crystallize the complex which is then recrystallized from ether and dried over sulphuric acid. These complexes are inactive for the copolymerization of an isoolefin and diolefin.

The preparation of the aryl ether complexes has usually involved the addition of solid aluminum chloride to a carbon disulfide solution of the ether with subsequent recrystallization of the complex compound from this solvent. This method has been applied for the preparation of the diphenyl etherate and the phenyl methyl etherate, $Al_2Cl_6.2(C_6H_5)_2O$ and $Al_2Cl_6.2C_6H_5OCH_3$. Molecular weight and empirical analyses established the formulae indicated. The anisole and diphenyl ether complexes prepared by this procedure varied in color; the original preparations were pink but the color intensified on standing.

Methyl chloride has been used for these preparations with considerable advantage since the etherates are obtained as colorless well crystallized solids. The solubilities of the complexes, $Al_2Cl_6.2C_6H_5OC_6H_5$ and $Al_2Cl_6.2C_6H_5OCH_3$, in methyl chloride are equivalent to about 23 and 35 g. $AlCl_3/100$ cc. $CH_3Cl$ at the boiling point of the saturated solutions (ca. 20° C.). In the experimental preparation of various etherates of aluminum chloride, methyl chloride was used as the solvent. In most experiments the desired mol ratios of aluminum chloride and ether or oxy compound were dissolved in methyl chloride and the complex isolated by evaporation to dryness. The high solubility of aluminum chloride in methyl chloride containing aryl ethers is a good indication of complex compound formation. In other experiments aluminum chloride was merely dissolved in the ethers to obtain a catalyst solution to test for polymerizing activity with respect to isobutylene, styrene and isoprene and to indicate the suitability of the ether as a catalyst solvent. In the polymerization tests an equal volume of methyl chloride was used with these monomers; in additional experiments styrene was frequently polymerized by the etherates of aluminum chloride without diluent and in these cases the temperature rise was 50 to 100° C. indicating a very rapid reaction and a high catalytic activity.

The initial study of etherates of Friedel-Crafts catalysts was carried out by dissolving 0.5–1.0 g. of either aluminum chloride or titanium tetrachloride in about 20 ml. of the ether. The reactions involved were the formation of the complex compound and its solution in the excess ether; these reactions occurred without any marked heat evolution. The ethers used successfully for catalyst solvents are: diphenyl ether, phenyl methyl ether, o-chlorophenyl ethyl ether, $\beta$ chloroethyl phenyl ether and $\beta\beta'$ dichloroethyl ether. In these solutions the mole ratio ether to aluminum chloride varied from 20 to 40 depending upon the molecular weight of the ether. The generality of this ether behavior is illustrated by the use of aluminum chloride, titanium tetrachloride and boron fluoride as the Friedel-Crafts catalysts. These experiments illustrate the function of certain ethers as catalyst solvents.

The preparation of catalyst solutions by dissolving the Friedel-Crafts catalysts directly in an ether of molecular weight of 100 or greater is very simple and yields solutions of very high concentration of the Friedel-Crafts type catalysts. These high concentrations of active metal halide catalysts may be utilized directly or after dilution for the present polymerization processes. This is well illustrated. This procedure is particularly advantageous in the case of boron trifluoride, which forms the liquid compound $BF_3.(ClCH_2CH_2)_2O$ containing about 32 wt. per cent $BF_3$ and is obtained by saturating $\beta\beta'$ dichloroethyl ether at room temperature with the gaseous boron fluoride. This liquid complex etherate may be employed directly or after dilution in polymerization reactions. The aluminum chloride complex with this halogenated ether is also a liquid at room temperature.

The colors of these complex catalyst solutions are indicated in the following tabulation:

| Friedel-Crafts Catalyst | $AlCl_3$ | $TiCl_4$ | $BF_3$ |
| --- | --- | --- | --- |
| Ether: | | | |
| Diphenyl ether | Brown | Dark reddish brown | |
| Phenyl methyl ether | Pink | | Yellow. |
| o-Chlorophenyl ethyl ether. | Purple | Dark reddish brown | Do. |
| $\beta$ chloroethyl phenyl ether. | Orange | do | Do. |
| $\beta\beta'$ dichloro ethyl ether. | Brown | do | Do. |

These color effects are not necessarily characteristic of these solutions of complex Friedel-Crafts compounds since the isolated pure complexes of diphenyl ether and anisole are colorless when freshly prepared in methyl chloride but develop the indicated colors on standing in contact with the dry atmosphere. All of these solutions obtained by dissolving Friedel-Crafts catalysts in aryl, alkyl-aryl, and chloroalkyl ethers were active in the polymerization of isobutylene, at temperatures in the range, −78 to −23° C. The chloro and nitro derivatives of the aryl and mixed aryl-alkyl ethers were also effective as catalyst solvents. An unexpected result in the isobutylene polymerization was the formation of a tougher product, hence higher molecular weight, than is obtained with aluminum chloride under the same conditions. The complex $Al_2Cl_6.2(C_6H_5)_2O$ dissolved in diphenyl ether polymerized styrene or copolymerized isobutylene and styrene readily, without any color formation which is characteristic of the polymerization with aluminum chloride as catalyst. This catalyst solution also polymerizes isoprene and there was a slight color change. The aluminum chloride solution in diphenyl ether was diluted to a concentration of 0.01 g. AlCl₃/100 ml. with methyl chloride and at this very high dilution, the complex catalyst was still very active in the polymerization of isobutylene and styrene, whereas an aluminum chloride solution was inactive at this dilution due to the impurities present in the methyl chloride. The chloro-phenetole solutions of aluminum chloride had similar polymerizing activity but the titanium tetrachloride solution in diphenyl ether polymerized isoprene readily as well as isobutylene and styrene. These qualitative polymerization experiments serve to illustrate specific catalyst effects among the different ether complexes and differences in their behavior and the Friedel-Crafts catalysts alone. The dichloroethyl ether solution of aluminum chloride was active in polymerizing isobutylene, styrene and isoprene after storage for one week; the polybutene was an oil and the polyisoprene was soluble.

The etherates listed in Table I were prepared by mixing the molar equivalents of the ether and aluminum chloride in methyl chloride at −23° C. All of the products indicated were isolated; the dichloroethyl etherate and the n-butyl etherates were yellow or brown liquids whereas the complexes of methyl ether, ethylene oxide, dioxane, trioxymethylene, anisole and phenyl ether, were white crystalline solids. The effect of molecular structure is evident in the series of ethers comprising methyl, n-butyl, ethylene oxide, dioxane and trioxymethylene. The two n-butyl etherates were active enough to produce oils with isobutylene and either an oil or a soluble polymer with isoprene. The catalysts with ethylene oxide were active for isobutylene, styrene and isoprene in the case of the diethylene oxide (Al₂Cl₆.2C₂H₄O) but inactive for these monomers with the tetraethylene oxide (Al₂Cl₆.4C₂H₄O). The reaction products of aluminum chloride and dioxane with either C₄H₈O₂/AlCl₃=0.5 or 1 were inactive polymerization catalysts and quite insoluble in methyl chloride. The product from one mole of aluminum chloride (Al₂Cl₆) and two moles of tri-oxymethylene was inactive for isobutylene polymerization but active for styrene and isoprene. No simple relation is evident, relating the activity of the aluminum chloride etherates and the molecular structure of the ether. The conclusions relative to catalytic activity have been based upon the polymerization of three monomers either in mass or in solution in methyl chloride at temperatures below −23° C. The mass polymerization of styrene was carried out at room temperature. The classification of catalytic activity is necessarily restricted to these experimental conditions which are primarily those related to the low temperature polymerization reactions. The results demonstrate (1) that Friedel-Crafts catalysts and their ether complex compounds behave differently, (2) the catalytic specificity of the complex depends upon the Friedel-Crafts reagent and the ether selected and (3) the activity and specificity depend upon molecular structure of the ether and its mole ratio to the aluminum chloride or other Friedel-Crafts type catalyst.

TABLE I

*Activity of etherates of aluminum chloride*

| | Isobutylene | Styrene | Isoprene |
|---|---|---|---|
| Al₂Cl₆.2CH₃OCH₃ | Inactive | | |
| Al₂Cl₆.4CH₃OCH₃ | do | | |
| Al₂Cl₆.2C₄H₉OC₄H₉ | Active (Oil) | Active | Active (Soluble). |
| Al₂Cl₆.4C₄H₉OC₄H₉ | do | do | Active (Oil). |
| Al₂Cl₆.2 (CH₂–O–CH₂) | Active | do | Active (Soluble). |
| Al₂Cl₆.4 (CH₂–O–CH₂) | Inactive | Inactive | Inactive. |
| Al₂Cl₆ (dioxane) | do | do | |
| Al₂Cl₆.2 (trioxymethylene) | do | Active | Active (Oil). |
| Al₂Cl₆.2C₆H₅OCH₃ | Active | do | Active. |
| Al₂Cl₆.2C₆H₅OC₆H₅ | do | do | Do. |
| Al₂Cl₆.2ClCH₂CH₂OCH₂CH₂Cl | Active | do | Do. |

EXAMPLE 1

A series of etherate complexes of Friedel-Crafts catalysts were prepared and tested in batch type polymerization reactions at temperatures of −102° C. using the complex compounds Al₂Cl₆.2(C₆H₅)₂O and Al₂Cl₆.2C₆H₅OCH₃

The diphenyl ether compound was prepared in and recrystallized from carbon disulfide; whereas the anisole complex of aluminum chloride was prepared in methyl chloride. The evaluation polymerizations with these catalysts involves standard polyisobutylene, B-3, B-8 and S-60 feeds as well as an experiment with B-3 feed and isobutane diluent. The experimental results are given in Tables II and III.

These tables show the excellent quality of co-polymer obtainable by the use of this catalyst.

In Table II the control polymerizations were carried out with an aluminum chloride catalyst solution.

The stocks for curing were compounded using the following formulae:

|  | 10 Parts Carbon Black Stock | Tread Stock |
|---|---|---|
| Polymer | 100 | 100 |
| Zinc Oxide | 5 | 5 |
| Stearic Acid | 3 | 3 |
| Tetra methyl thiuram disulfide | 1 | 1 |
| Mercaptobenzothiazole |  | 0.5 |
| Channel Black | 10 | 50 |
| Sulfur | 1.5 | 2 |

TABLE II

*Polymerization by the complex catalyst $Al_2Cl_6 \cdot 2C_6H_5OC_6H_5$ at $-102°$ C.*

| Exp. Number | Feed | Catalyst Conc. Equiv. g. AlCl₃/100 cc. | Conv., Wt. Per Cent | Eff. g. poly./g. AlCl₃ | Low Polymer, Wt. Per Cent | Unsat. Mol Per Cent (ICl) | Intr. Vis. | Mol. Wt. ×10⁻³ | |
|---|---|---|---|---|---|---|---|---|---|
|  |  |  |  |  |  |  |  | Staud. | Vis. Aver. |
| 337-5-1 | B-0 | 0.09 | 85 | 2,800 | 2.0 | --- | 7.26 | 230 | 5,800 |
| 337-5-16 | B-0 (Control) | .25 | 70 | 1,320 | 4.4 | --- | 5.34 | 165 | 3,650 |
| 337-5-5 | B-3 | .09 | 5 | 230 | 39.4 | 1.29 | 2.12 | 67 | 860 |
| 337-5-2 | do | .09 | 19 | 740 | 12.1 | 1.12 | 2.12 | 67 | 860 |
| 337-5-3 | do | .09 | 38 | 810 | 9.5 | 1.40 | 2.05 | 64 | 800 |
| 337-5-8 | do | .17 | 44 | 200 | 12.2 | 1.24 | 1.82 | 57 | 680 |
| 337-5-4 | do | .09 | 61 | 800 | 16.1 | 1.46 | 1.70 | 54 | 600 |
| 337-5-14 | do | .17 | 71 | 430 | 7.9 | 1.66 | 1.62 | 51 | 560 |
| 337-5-18 | B-3 (Control) | .25 | 47 | 440 | 10.1 | 1.43 | 1.90 | 59 | 710 |
| 337-5-17 | do | .25 | 73 | 480 | 11.0 | 1.80 | 1.46 | 46 | 480 |
| 337-5-13 | B-3 (i-C₄H₁₀ Diluent) | .17 | 48 | 170 | 12.5 | 2.10 | 1.20 | 38 | 350 |
| 337-5-22 | B-3 (i-C₄H₁₀ Diluent Control) | .25 | 50 | 290 | 17.5 | 2.44 | 1.12 | 35 | 315 |
| 337-5-6 | B-8 | .17 | 34 | 150 | 26.6 | 3.42 | .93 | 29 | 235 |
| 337-5-7 | do | .17 | 53 | 140 | 38.0 | 3.73 | .90 | 28 | 225 |
| 337-3-8 | B-8 (Control) | .25 | 58 | 290 | 19.9 | 4.15 | 1.18 | 37 | 340 |
| 337-5-9 | S-60 | .17 | 100 | 270 | --- | --- | .78 | --- | --- |
| 337-5-19 | S-60 (Control) | .25 | 100 | 200 | --- | --- | .94 | --- | --- |

| Exp. Number | Feed | Mooney Vis. 212° F. | Parts Carbon Black | Tensile, 300% Modulus, Elongation Cured at 307° F. | | | |
|---|---|---|---|---|---|---|---|
|  |  |  |  | 20' | 40' | 80' | 120' |
| 337-5-1 | B-0 | --- | --- | --- | --- | --- | --- |
| 337-5-16 | B-0 (Control) | --- | --- | --- | --- | --- | --- |
| 337-5-5 | B-3 | --- | --- | --- | --- | --- | --- |
| 337-5-2 | do | 77 | 50 | 3,100—370—750 | 3,000—570—700 | 2,900—780—600 | 2,900—880—600 |
| 337-5-3 | do |  |  |  |  |  |  |
| 337-5-8 | do | 72 | 50 | 3,100—410—750 | 2,900—660—650 | 2,900—850—600 | 2,900—950—550 |
| 337-5-4 | do | 80 | 50 | 3,100—380—800 | 3,000—650—700 | 2,900—1,030—600 | 2,900—1,030—600 |
| 337-5-14 | do | 64 | 50 | 3,000—510—750 | 3,100—750—650 | 3,000—980—550 | 3,000—1,110—550 |
|  |  |  | 10 | 4,000   900 | 3,400   750 |  |  |
| 337-5-18 | B-3 (Control) | 78 | 50 | 3,200—540—700 | 3,100—780—650 | 3,200—1,090—550 | 3,000—1,150—550 |
| 337-5-17 | do | 51 | 50 | 3,000—500—700 | 3,000—850—650 | 2,800—1,050—550 | --- |
|  |  |  | 10 | 3,800   850 | 3,100   750 |  |  |
| 337-5-13 | B-3 (i-C₄H₁₀ Diluent) | 40 | 50 | 2,900—510—750 | 2,800—850—600 | 2,600—1,140—500 | 2,500—1,310—450 |
| 337-5-22 | B-3 (i-C₄H₁₀ Diluent Control) | 33 | 50 | 2,700—710—700 | 2,600—1,040—550 | 2,400—1,360—450 | 1,900—1,430—350 |
| 337-5-6 | B-8 | 24 | 50 | 2,500—960—600 | 2,300—1,440—450 | 2,300—1,870—350 | 2,100—1,960—300 |
| 337-5-7 | do |  | 10 | 900   550 | 700   350 |  |  |
| 337-3-8 | B-8 (Control) | 60 | 50 | 2,700—710—650 | 2,400—1,040—500 | 2,200—1,340—400 | 2,100—1,450—400 |
|  |  |  | 10 | 1,000   400 | 700   300 | 800   400 | --- |
| 337-5-9 | S-60 | --- | --- | --- | --- | --- | --- |
| 337-5-19 | S-60 (Control) | --- | --- | --- | --- | --- | --- |

NOTE.—3:1 diluent ratio in all experiments.

TABLE II-A

*Polymerizations by the complex catalyst $Al_2Cl_6 \cdot 2C_6H_5OCH_3$ at $-102°$ C.*

| Exp. Number | Feed | Catalyst Conc. Equiv. g. AlCl₃/100 cc. | Conv., Wt. Per Cent | Eff. g. poly./g. AlCl₃ | Low Polymer, Wt. Per Cent | Unsat. Mol Per Cent (ICl) | Intr. Vis. | Mol. Wt. ×10⁻³ | |
|---|---|---|---|---|---|---|---|---|---|
|  |  |  |  |  |  |  |  | Staud. | Vis. Aver. |
| 337-17-1 | B-0 (3:1) | 0.17 | 89 | 980 | 3.2 | --- | 6.55 | 205 | 3,800 |
| 337-17-9 | B-0 (3:1 Control) | .15 | 14 | 300 | 15.2 | --- | 4.50 | 140 | 2,800 |
| 337-17-2* | B-0 (2:1) | .17 | 85 | 2,060 | 15.6 | --- | 4.72 | 147 | 3,000 |
| 337-17-10 | B-0 (2:1 Control) | .15 | 33 | 550 | 14.7 | --- | 3.78 | 120 | 2,100 |
| 337-17-3 | B-3 | .17 | 55 | 320 | 5.2 | 1.35 | 2.15 | 68 | 870 |
| 337-17-4 | do | .17 | 67 | 300 | 4.6 | 1.62 | 1.95 | 61 | 750 |
| 337-17-5 | do | .17 | 74 | 230 | 16.2 | 1.62 | 1.80 | 57 | 660 |
| 337-17-11 | B-3 (Control) | .15 | 72 | 620 | 10.0 | 1.49 | 1.78 | 56 | 650 |
| 337-17-6 | B-8 | .17 | 50 | 190 | 20.8 | 3.97 | 1.15 | 36 | 330 |
| 337-17-7 | do | .17 | 62 | 160 | 14.8 | 3.97 | 1.09 | 34 | 300 |
| 337-17-12 | B-8 (Control) | .15 | 71 | 330 | 34.4 | 4.18 | .99 | 31 | 260 |

*Reactor set up.
Diluent ratio 3:1 unless specified.

TABLE II-A—Continued

Polymerizations by the complex catalyst $Al_2Cl_6.2C_6H_5OCH_3$ at $-102°$ C.—Continued

| Exp. Number | Feed | Mooney Vis. 212° F. | Parts Carbon Black | Tensile, 300% Modulus, Elongation Cured at 308° F. | | | |
|---|---|---|---|---|---|---|---|
| | | | | 20' | 40' | 80' | 120' |
| 337–17–3 | B-3 | 74 | 50 | 3,200—350—850 | 3,200—560—750 | 3,000—800—650 | 3,200—910—650 |
| | | | 10 | 1,900   800 | 1,900   750 | 1,800   700 | 1,700   650 |
| 337–17–4 | do | 77 | 50 | 3,100—380—800 | 2,900—630—700 | 2,900—900—550 | 2,000—1,050—600 |
| | | | 10 | 2,100   850 | 1,900   750 | 2,500   60 | 3,600   700 |
| 337–17–5 | do | 81 | 50 | 3,100—350—850 | 3,000—640—700 | 3,000—860—600 | 3,100—960—600 |
| | | | 10 | 3,800   800 | 3,700   700 | 3,400   650 | 900   400 |
| 337–17–11 | B-3 (Control) | 82 | 50 | 3,200—430—750 | 3,200—730—700 | 3,200—970—600 | 3,100—1,050—600 |
| | | | 10 | 4,100   850 | 3,600   700 | 3,200   700 | 3,100   650 |
| 337–17–6 | B-8 | 43 | 50 | 2,700—960—600 | 2,500—1,520—450 | 2,300—1,950—350 | 2,300—2,000—350 |
| | | | 10 | 900   450 | 800   400 | 600   300 | 1,800   550 |
| 337–17–7 | do | 41 | 50 | 2,600—1,000—600 | 2,400—1,490—450 | 2,400—1,930—350 | 2,300—1,880—350 |
| | | | 10 | 700   400 | 600   300 | 600   300 | 700   350 |
| 337–17–12 | B-8 (Control) | 33 | 50 | 2,800—1,010—600 | 2,600—1,510—450 | 2,400—1,880—400 | 2,400—1,940—400 |
| | | | 10 | 1,300   500 | 700   400 | 700   350 | 1,100   400 |

TABLE III

| Feed Designation | B-0 | B-3 | B-8 | S-60 |
|---|---|---|---|---|
| Isobutylene grams | 230 | 230 | 230 | 80 |
| Isoprene | | 6.9 | 18.4 | |
| Methyl chloride | 1,155 | 1,155 | 1,155 | 847 |
| Styrene | | | | 120 |

The percent low polymer is the proportion by weight of the total polymer whose Staudinger molecular weight is below about 20,000.

EXAMPLE 2

A similar series of polymerizations were conducted using chlorine-substituted and phenyl substituted ethers, as shown in Table IV:

TABLE IV

Ether derivatives as catalyst solvents

| Catalyst | $AlCl_3$ | $BF_3$ |
|---|---|---|
| $CH_3OCH_3$ | Inactive | Inactive. |
| $ClCH_2OCH_3$ | do | Active. |
| $ClCH_2OCH_2Cl$ | Active | Do. |
| $C_6H_5CH_2OCH_3$ | Inactive | Do. |
| $C_6H_5CH_2OCH_2C_6H_5$ | do | Inactive. |
| $C_6H_5OCH_3$ | Active | Active. |
| $CH_3CH_2OCH_2CH_3$ | Inactive | Inactive. |
| $ClCH_2CH_2OCH_2Cl$ | Active | Active. |
| $ClCH_2CHClOCH_2CH_3$ | Inactive | Do. |

There is a substantial difference in the behavior of aluminum chloride and boron fluoride with the same ether in regard to polymerizing activity; for example, chloromethyl ether deactivates aluminum chloride but yields an active catalyst solution with boron fluoride. The specificity in the activity of complex catalysts must be clearly recognized. The symmetrical dichloromethyl ether however yields active catalyst solutions with both aluminum chloride and boron fluoride. The phenyl substituted dimethyl ethers yielded only inactive catalyst solutions with aluminum chloride. On the basis of the very limited results, it appears that the boron fluoride etherate is active whenever the ether forms an active complex with aluminum chloride. The etherates of aluminum chloride are more frequently inactive for low temperature polymerization of isobutylene than the same etherates of boron fluoride.

Previously it was shown that chlorinated ethers of the mixed alkylaryl type yielded active complex compounds with Friedel-Crafts type catalysts: the present study is concerned with the behavior of nitro derivatives of ethers and of diethers. These results are summarized in Table V. The ortho and para nitro-anisoles (nitrophenyl methyl ether) deactivated aluminum chloride at a mol ratio of one; the activity at a 0.5 mol ratio of the nitro ethers to aluminum chloride may indicate active complexes of these proportions although these complexes have not been isolated. The nitro-anisoles also yielded inactive catalyst solutions with titanium tetrachloride and boron fluoride when the ether was present in excess. The p-nitrophenyl phenyl ether appears to form only active complexes with aluminum chloride and boron fluoride. This is another example of the unpredictable effects relative to the activity of complexes of the Friedel-Crafts catalysts. The effect of the nitro group in the ethers was unexpected since nitro compounds generally form active complexes with these catalysts.

TABLE V

Behavior of Friedel-Crafts catalyst with ethers

| Ether | Mol Ratio of Ether to Halide Catalyst and Phlymerizing Activity | | |
|---|---|---|---|
| | $AlCl_3$ | $TiCl_4$ | $BF_3$ |
| Anisole  | Excess-Active | Excess-Active | Excess-Active. |
| o-Nitroanisole 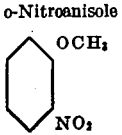 | 0.5 Active, 1.0 Inactive | Excess-Inactive | Excess-Inactive. |

Table V—Continued

*Behavior of Friedel-Crafts catalyst with ethers—Continued*

| Ether | Mol Ratio of Ether to Halide Catalyst and Polymerizing Activity | | |
|---|---|---|---|
| | AlCl₃ | TiCl₄ | BF₃ |
| p-Nitroanisole (OCH₃, NO₂ substituents on benzene) | 0.5 Active, 1.0 Inactive | | Excess-Active. |
| Diphenyl ether | Excess-Active | Excess-Active | Do. |
| p-Nitro phenyl ether | 1.4 Active, 5.6 Active | | Do. |
| Dibenzofurane | 1.8 Active, 9.0 Active | | |
| 1-2 Diethoxy benzene (OC₂H₅, OC₂H₅) | 0.5 Active, 1.0 Inactive | | Do. |
| 1 Ethoxy 2 phenoxy ethane $C_2H_5OCH_2CH_2OC_6H_5$ | 0.5 Inactive | | |
| 1,2 Diphenoxy ethane $C_6H_5OCH_2CH_2OC_6H_5$ | 0.5 Active, Excess-Active | 4.4 Active | Do. |
| 3-4 Methylenedioxy-1 propenyl benzene | 0.5 Active, 1.0 Inactive | | |

Variation in the ether type linkage is illustrated by the dibenzofuran structure which appears to form only active complexes with aluminum chloride. Phenyl ether forms only active complexes with aluminum chloride yet 1-2 diethoxybenzene deactivates this catalyst at a mol ratio of 1. The cyclic diether, 3-4 methylene dioxy 1 propenyl benzene behaved similarly giving active catalyst solutions with a mol ratio of 0.5 but yielding a deactivated catalyst at a mol ratio of 1. The diphenyl ether of ethylene glycol yields only active compounds with aluminum chloride, titanium tetrachloride and boron fluoride. The ethyl phenyl ether of ethylene glycol appears to form only inactive compounds with aluminum chloride. The diethers are useful in forming complex catalysts with Friedel-Crafts type reagents but their activity does not conform to the relationships obtained for the mono-ethers.

Polymerizations have been carried out at $-102°$ C. with the complex compounds $$Al_2Cl_6 \cdot 2ClCH_2CH_2OCH_2CH_2Cl$$

$$BF_3 \cdot ClCH_2CH_2OCH_2CH_2Cl$$

and $$TiCl_4 \cdot ClCH_2CH_2OCH_2CH_2Cl$$

in order to compare the polymer properties obtained with the three complex Friedel-Crafts catalysts. The aluminum chloride complex appears to be the most satisfactory catalyst of these three and the boron fluoride ranking second based upon the molecular weight of the products formed. In general these complex catalysts had lower catalyst efficiencies than the aluminum chloride in control experiments.

TABLE VI

*Polymerizations at −102° C. by the complex catalysts of the Friedel-Crafts type with ββ' dichloroethyl ether*

| Exp. No. | Feed | Catalyst Conc. Equiv. AlCl₃/100 cc. CH₃Cl | Concn., wt. Percent | Cat. Eff. g. polymer, g. AlCl₃ | Unsat. (ICl), Mol. Percent | Low Polymer, wt. Percent | Int. Vis. | Mol. Wt.×10⁻³ Staud. | Mol. Wt.×10⁻³ Vis. Average |
|---|---|---|---|---|---|---|---|---|---|
| Al₂Cl₆.2ClCH₂CH₂OCH₂CH₂Cl | | | | | | | | | |
| 337-32-19 | B-0 | 0.15 | 52 | 660 | ------ | 1.5 | 8.10 | 255 | 6,900 |
| 337-32-16 | B-3 | .30 | 44 | 190 | 0.96 | 5.7 | 2.00 | 63 | 780 |
| 337-32-17 | do | .30 | 61 | 170 | 1.21 | 5.4 | 1.95 | 61 | 750 |
| 337-32-21 | do | .15 | 76 | 240 | 1.40 | 7.3 | 1.70 | 53 | 600 |
| 337-32-18 | S-60 | .30 | 100 | 250 | ------ | ------ | 1.13 | ------ | ------ |
| BF₃.ClCH₂CH₂OCH₂CH₂Cl (g. BF₃/100 cc. CH₃Cl) | | | | | | | | | |
| 337-51-1 | B-0 | .29 | 31 | 180 | ------ | ------ | 5.10 | 160 | 3,400 |
| 337-51-2 | B-3 | .29 | 60 | 110 | 1.82 | ------ | 1.05 | 33 | 285 |
| 337-51-10 | do | .29 | 73 | 110 | 1.88 | ------ | 1.37 | 40 | 410 |
| 337-51-6 | B-8 | .29 | 71 | 60 | 4.45 | ------ | .68 | 21 | 145 |
| 337-51-5 | S-60 | .29 | 100 | 170 | ------ | ------ | .52 | ------ | ------ |
| 337-51-9 | S-100 | .29 | 50 | 40 | ------ | ------ | 1.19 | ------ | ------ |
| TiCl₄.ClCH₂CH₂OCH₂CH₂Cl (g. TiCl₄/100 cc.CH₃Cl) | | | | | | | | | |
| 337-52-1 | B-0 | .30 | 54 | 230 | ------ | ------ | 1.70 | 53 | 600 |
| 337-52-2 | B-3 | .30 | 45 | 120 | 1.54 | ------ | .85 | 27 | 200 |
| 337-52-3 | B-8 | .30 | 37 | 60 | 3.85 | ------ | .68 | 21 | 145 |
| 337-52-6 | S-60 | .30 | 100 | 60 | ------ | ------ | .44 | ------ | ------ |
| 337-52-7 | S-100 | .30 | 100 | 250 | ------ | ------ | .83 | ------ | ------ |
| 337-46-7 | B-0 (control) | 0.20 | 34 | 560 | ------ | 7.5 | 4.10 | 130 | 2,400 |
| 337-5-17 | B-3 (control) | .25 | 73 | 480 | 1.80 | 11.0 | 1.46 | 46 | 480 |
| 337-3-8 | B-8 (control) | .20 | 58 | 290 | 4.15 | 19.9 | 1.18 | 37 | 340 |
| 337-46-3 | S-60 | .20 | 100 | 670 | ------ | ------ | 0.71 | ------ | ------ |

3:1 methyl chloride diluent ratio.

TABLE VI

*Polymerizations at −102° C. by the complex catalysts of the Friedel-Crafts type with ββ' dichloroethyl ether*

| Exp. No. | Feed | Mooney Viscosity 100° C. 8 min. | Parts, Carbon Black | Tensile 300% Modulus Elongation 307° F. 20' | 40' | 60' | 80' |
|---|---|---|---|---|---|---|---|
| Al₂Cl₆.2ClCH₂CH₂OCH₂CH₂Cl | | | | | | | |
| 337-32-19 | B-0 | | | | | | |
| 337-32-16 | B-3 | 80 | 50 | 3,100—420—800 | 3,100—670—700 | 3,100—810—650 | 3,100—890—600 |
| 337-32-17 | do | 84 | 50 / 10 | 3,100—480—750 / 3,900  800 | 3,100—710—700 / 3,500  650 | 3,100—820—650 / 3,300  650 | 3,100—950—600 / 2,900  600 |
| 337-32-21 | do | 84 | 50 / 10 | 3,100—500—800 / 3,700  900 | 3,100—790—700 / 3,400  750 | 3,100—990—650 | 3,000—960—600 |
| 337-32-18 | S-60 | | | | | | |
| BF₃.ClCH₂CH₂OCH₂CH₂Cl | | | | | | | |
| 337-51-1 | B-0 | | | | | | |
| 337-51-2 | B-3 | 29 | 50 / 10 | 2,200—210—800 / 2,600  850 | 2,500—450—800 / 2,700  700 | 2,500—610—750 / 2,500  700 | 2,600—690—700 / 2,400  650 |
| 337-51-10 | do | 34 | 50 / 10 | 2,600—340—850 / 3,000  800 | 2,700—600—750 / 2,500  650 | 2,700—770—700 / 1,600  550 | 2,700—820—650 / 1,200  450 |
| 337-51-6 | B-8 | 10 | 50 / 10 | 1,900—630—700 / 700  450 | 2,000—1,090—500 / 600  350 | 2,200—1,350—400 / 500  300 | 1,900—1,460—400 / 600  300 |
| 337-51-5 | S-60 | | | | | | |
| 337-51-9 | S-100 | | | | | | |
| TiCl₄.ClCH₂CH₂OCH₂CH₂Cl | | | | | | | |
| 337-52-1 | B-0 | | | | | | |
| 337-52-2 | B-3 | 24 | 50 | 2,200—400—850 | 2,500—660—750 | 2,600—820—700 | 2,700—890—650 |
| 337-52-3 | B-8 | 14 | 50 / 10 | 2,000—400—900 / 1,000  550 | 2,000—1,540—380 / 800  400 | 2,000—1,550  350 / 800  300 | 2,100—1,420—450 / 700  300 |
| 337-52-6 | S-60 | | | | | | |
| 337-52-7 | S-100 | | | | | | |
| 337-46-7 | B-0 (control) | | 50 | 3,000—500—700 | 3,000— 850—650 | 2,800—1,050—550 | |
| 337-5-17 | B-3 (control) | 51 | 10 / 50 | 3,800  850 / | 3,100  750 / | / | / |
| 337-3-8 | B-8 (control) | 60 | 50 / 10 | 2,700—710—650 / 1,000  400 | 2,400—1,040—500 / 700  300 | 2,200—1,340—400 / 800  400 | 2,100—1,450—400 / |
| 337-46-3 | S-60 | | | | | | |

3:1 methyl chloride diluent ratio.

The chlorex ($\beta\beta'$ dichloroethyl ether) complex of aluminum chloride produced a polybutene with a viscosity average molecular weight of 6,900,000 (Staudinger 255,000) at a conversion 52% while the control polybutene had 2,400,000 (Staudinger 130,000) at a conversion of 34%. A marked improvement was also obtained in the intrinsic viscosity of the S-60 polymer at 100% conversion; here the aluminum chloride-chlorex complex yielded a polymer with an intrinsic viscosity of 1.13 compared to the control with a value of 0.71. This is an increase of about 50% in this function of the average molecular weight and is a significant improvement. The B-3 polymers prepared with the aluminum chloride complex had slightly lower catalyst efficiencies and slightly lower unsaturation values than the control polymer. The molecular weights and Mooney viscosities were appreciably higher and did not vary with conversion as much as the products prepared with standard catalyst. The vulcanizate properties of the B-3 polymers were essentially the equivalent of the standard product.

The boron fluoride etherate appeared to yield lower molecular weight products than the aluminum chloride etherate. The polybutene obtained with the boron fluoride complex was still of higher molecular weight (viscosity average 3,400,000 and Staudinger 160,000) than the control polybutene (viscosity average 2,400,000 and Staudinger 130,000). The S-60 polymer with this catalyst is less satisfactory than the control polymer; the respective intrinsic viscosities were 0.52 and 0.71. The B-3 polymers were lower in molecular weight and Mooney viscosity than the controls yet the vulcanizate properties were only slightly lower in tensile strength and modulus. The B-8 polymer was definitely inferior in its physical properties both in the raw stock and in cured state. The S-100 feed is a polymer consisting of polystyrene.

The molecular weights of these products were still further decreased when the titanium tetrachloride etherate was used. The polybutene with this catalyst had an extremely low molecular weight (viscosity average 600,000 Staudinger 53,000). The B-3 polymer at 45% conversion had a Mooney viscosity of 24 but only slightly lowered physical properties in the cured state. The B-8 likewise had very low molecular weight but had only slightly lower tensile strength than the control polymer.

Table VI shows the results of a series of polymerizations conducted with the substituted ether complexes for the making of a sulfurizable copolymer and shows the excellent quality of copolymer obtainable by these catalyst complexes.

Thus the process of the invention polymerizes and copolymerizes olefinic materials by the application thereto at low temperature of dissolved complexes of Friedel-Crafts catalysts with ethers.

While there are above disclosed but a limited number of embodiments of the process and product of the invention, it is possible to produce still other embodiments without departing from the inventive concept herein disclosed and it is therefore desired that only such limitations be imposed on the appended claims as are stated therein or required by the prior art.

The invention claimed is:

1. A polymerization process for the polymerization of an unsaturated hydrocarbon selected from the group consisting of isobutylene, styrene, and isoprene at a temperature between —10° C. and —103° C. comprising the steps of adding to the cold unsaturated material a polymerization catalyst comprising a complex of a Friedel-Crafts metal halide chosen from the group consisting of aluminum chloride, titanium tetrachloride and boron fluoride and an ether chosen from the class consisting of anisol, diphenyl ether, $\beta$, $\beta'$ dichloroethylether, and 1,2-diphenoxyethane, said catalyst complex consisting of no more than 40 moles of ether per mole of metal halide.

2. A polymerization process for the polymerization of an unsaturated hydrocarbon selected from the group consisting of isobutylene, styrene, and isoprene at a temperature between —10° C. and —103° C. comprising the steps of adding to the cold unsaturated material a polymerization catalyst comprising a complex of diphenyl ether and a Friedel-Crafts catalyst chosen from the class consisting of aluminum chloride, titanium tetrachloride and boron fluoride, said catalyst complex consisting of no more than 40 moles of ether per mole of Friedel-Crafts catalyst.

3. A polymerization process for the polymerization of an unsaturated hydrocarbon selected from the group consisting of isobutylene, styrene, and isoprene at a temperature between —10° C. and —103° C. comprising the steps of adding to the cold unsaturated material a polymerization catalyst comprising a complex of $\beta$, $\beta'$ dichloroethyl ether and a Friedel-Crafts catalyst chosen from the class consisting of aluminum chloride, titanium tetrachloride and boron fluoride, said catalyst complex consisting of no more than 40 moles of ether per mole of Friedel-Crafts catalyst.

4. A polymerization process for the polymerization of unsaturated hydrocarbons having at least one ethylenic linkage and selected from the group consisting of styrene, isobutylene, and isoprene which comprises the steps of adding to the cold unsaturated material at a temperature between —10° C. and —103° C., a polymerization catalyst comprising a complex of aluminum chloride and diphenyl ether, said polymerization catalyst consisting of no more than 40 moles of ether per mole of aluminum chloride.

5. A polymerization process for the polymerization of unsaturated hydrocarbons having at least one ethylenic linkage and selected from the group consisting of styrene, isobutylene, and isoprene which comprises the steps of adding to the cold unsaturated material at a temperature between —10° C. and —103° C., a polymerization catalyst comprising a complex of aluminum chloride and $\beta$, $\beta'$ dichloroethyl ether, said polymerization catalyst consisting of no more than 40 moles of ether per mole of aluminum chloride.

RALPH W. DORNTE.

REFERENCES CITED

The following references are of record in the file of this patent:

UNITED STATES PATENTS

| Number | Name | Date |
|---|---|---|
| 2,243,658 | Thomas | May 27, 1941 |
| 2,360,632 | Mann et al. | Oct. 17, 1944 |
| 2,379,656 | Ruthruff | July 3, 1945 |
| 2,382,586 | Solomon | Aug. 14, 1945 |
| 2,384,916 | Holmes | Sept. 18, 1945 |

FOREIGN PATENTS

| Number | Country | Date |
|---|---|---|
| 106,371 | Austria | Jan. 26, 1939 |
| 441,064 | Great Britain | Jan. 9, 1936 |
| 801,883 | France | Aug. 20, 1936 |